United States Patent Office 2,906,055
Patented Sept. 29, 1959

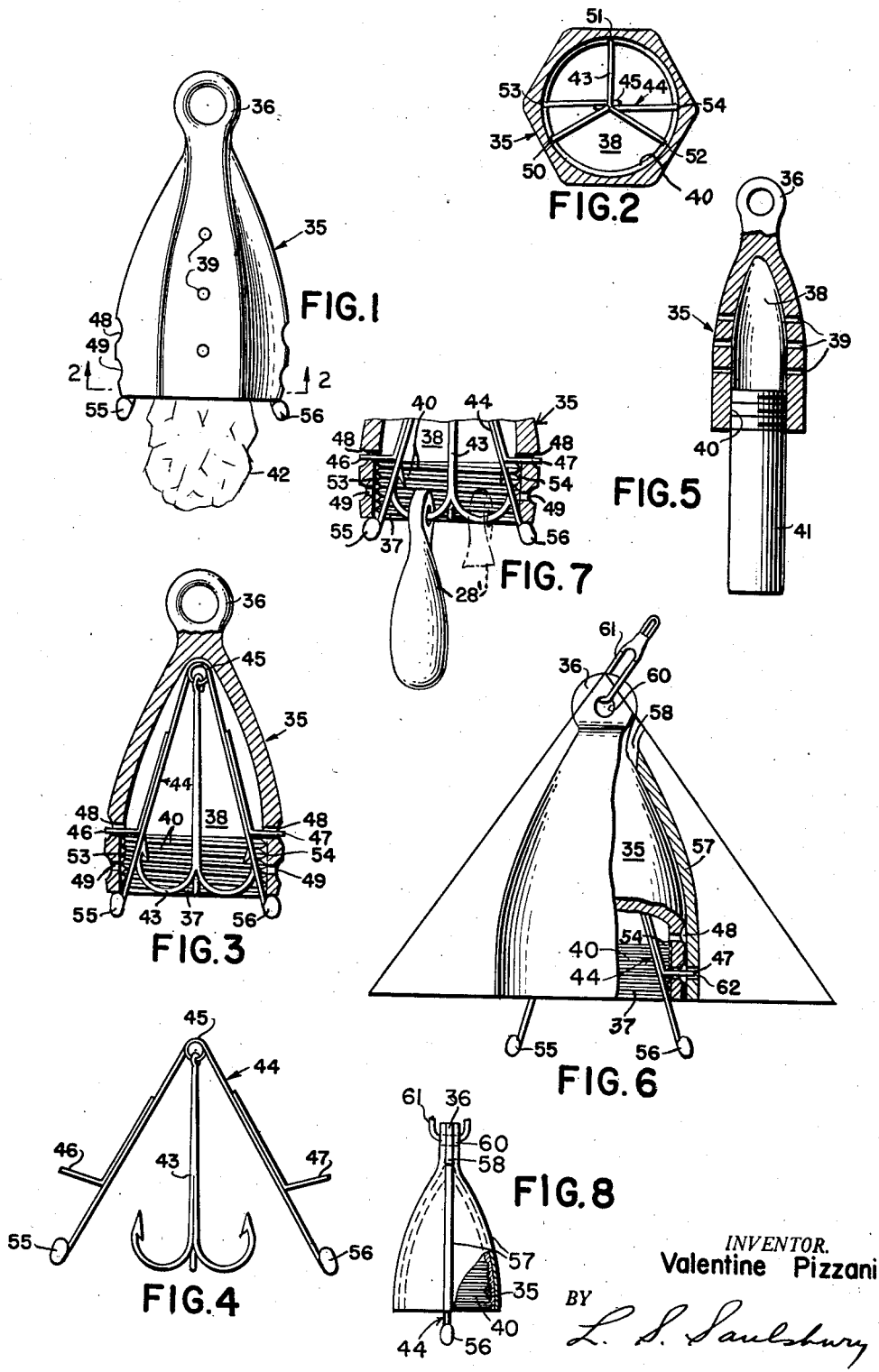

2,906,055

COMBINED FISH LINE SINKER AND CHUM DISPENSER

Valentine Pizzani, Bronx, N.Y.

Application March 8, 1956, Serial No. 570,323

6 Claims. (Cl. 43—44.99)

This invention relates to a combined fish line sinker and chum dispenser.

It is a principal object of the present invention to provide a shell type sinker adapted to have a bottle of fish oil chum which can be enclosed by the sinker or which can be attached to the sinker in such a manner that the oil can be dispensed into the interior thereof and will leave the sinker through holes or perforations in the walls thereof and wherein this chum can be easily replaced in bottle form upon the sinker.

It is another object of the invention to provide a combined sinker and chum oil dispenser adapted not only to have a bottle of chum oil secured thereto but is so constructed that solid fishing chum as cut squid, clams, strips of dead fish can be locked within the sinker shell and extended through the open trailing end of the shell to give the fish access to the chum.

It is still another object of the invention to provide a combined sinker and fish chum dispenser adapted to have fish chum secured thereto wherein the spring retainer for keeping the hook bearing the fish chum within the end of the sinker may serve also by a different adjustment thereof within the sinker as a lock fastener for a vane weight slid externally over the exterior of the sinker to give added weight thereto and to give some buoyancy and stability to the weight when being pulled through the water.

It is still another object of the invention to provide a sinker for a fishing lure which is hollow and in which lead weights can be added or attached by the same means by which the chum is attached at times when further weight is needed for the sinker and to thereby eliminate the need for cutting the line to replace the sinker with a heavier sinker.

It is a further object of the invention to provide a fish chum dispenser adapted to dispense either liquid or solid fish chum.

Other objects of the invention are to provide a combined fish line sinker and chum dispenser which has the above objects in mind, that is of simple construction, inexpensive to manufacture, has a minimum number of parts, of pleasing appearance, durable, easy to fix to the fish line, compact, efficient and effective in use.

For a better understanding of the invention, reference may be had to the following detail description taken in connection with the accompanying drawing, in which Fig. 1 is an elevational view of a sinker constructed according to one form of the invention where the sinker is open on its lower end and adapted to receive fish chum, Fig. 2 is a transverse sectional view taken on line 2—2 of Fig. 1 and across the opened lower end of the sinker, Fig. 3 is a vertical sectional view showing the interior of the shell with the chum retaining hook and its spring catch extended upwardly thereinto in the elevated position, Fig. 4 is an elevational view of the chum retaining hook and the spring catch assembly removed from the sinker.

Fig. 5 is a vertical sectional view of the sinker with a chum bottle threaded into the lower end of the sinker to supply chum oil thereto, Fig. 6 is a fragmentary elevational view of the chum sinker with a lifting vane weight extended up over the side thereof and the spring catch for holding chum bait within the sinker being adjusted and used to maintain the lifting vane against vertical displacement from the sinker, Fig. 7 is a fragmentary sectional view of an added weight secured within the sinker by the spring catch, and Fig. 8 is a fragmentary side elevational view of the assembly shown in Fig. 6.

Referring now to Figs. 1 to 8, 35 represents a hollow sinker constructed according to the form of the invention that is of one piece and has a ring attaching portion 36 at its upper end into which a line can be fastened and an open lower end 37 through which the fish chum is introduced. The sinker is generally tapered from the lower portion toward the attaching ring and has a chamber 38 extending upwardly thereinto from the open end and communicating therewith and a plurality of perforations 39 through which fish chum oil can be dispensed. The open lower end 37 is internally threaded as indicated at 40 to receive a fish chum container 41 that is threaded at its open end and which is adapted to supply the chamber 38 with the fish chum oil, Fig. 5.

If it is desired to use clams or dead fish chum 42, a triple fish hook 43 is used. This hook is maintained within the chamber 38 by an inverted V-shaped spring catch member 44 that has a coil spring ring 45 for containing the hook 43 at the apex of the catch and lugs 46 and 47 extending respectively from the opposite sides of the catch legs and adapted to extend into either of two sets of holes 48 or 49 in the sinker body adjacent the open lower end 37 thereof. With the fish chum secured to the hook, the hook will be held against angular displacement within the opening 38 by vertical grooves 50, 51 and 52 with which the rounded pointed ends of the hook will be registered as the chum assembly is extended into the chamber 38. This will keep the chum from being rotated within the chamber 38 and will sustain it against displacement from the hook. The ends of spring lugs 46 and 47 will be guided to the holes 48 and 49 by vertical grooves 53 and 54 as the catch is moved upwardly with the fish chum into the chamber 38. Small handle portions 55 and 56 are provided on the lower ends of the spring catch to receive the thumb and finger which is used to depress the spring catch when moving the chum assembly into place within the chamber 38 or when releasing the chum assembly therefrom. If it is desired that the chum extend to a greater extent below the open end 37 of the sinker, the lugs 46 and 47 of the spring catch are lowered to the holes 49.

A lifting vane 57 can, as shown in Fig. 6, be slid downwardly over the exterior of the sinker 35 from the ring end thereof. This vane has a top opening 58 so that the ring attaching portion 36 of the sinker 35 can extend through the same. This lifting vane while having its vane body hollow and conforming generally to the shape of the exterior of the sinker 35, does have a triangular plate-like vane formation extending from the opposite sides of its body and with its apex end being severed and extended about opposite sides of the hole in the ring attaching portion so as to receive the ring portion 36 of the sinker. This apex end has a hole 60 so that a safety fastener 61 may extend therethrough to pull the vane 57 with the sinker and as well to retain the sinker and vane together. To further retain the vane upon the sinker to insure tight gripping relationship therewith the lugs 46 and 47 are lowered to the holes 49 so as to extend into holes 62 in the vane body. It will be seen that the lugs 46 and 47 can readily extend beyond the outer ends of the holes 49 and into the vane body since the ends will be enclosed by the vane body and thus will not be so apt to pick up weeds or interfere with the pulling of the sinker through the water. The vane body will also give lifting power to the sinker at times when the sinker is being pulled through the water.

It should now be apparent that there has been provided a fish chum dispenser by which either liquid or solid fish chum may be dispensed and as well a sinker by which added weights can be applied to the sinker either at times when it is used solely for its sinking purpose and not dispensing chum or at times when the chum is to be dispensed, all of this being done without having to change and detach the sinker from the line at times when added or even less weight is needed.

It will also be apparent that in the form of the invention shown in Fig. 5 that an added weight could be placed in the chamber 38 without interfering with the dispensing of the chum oil and the chum oil bottle 41 would serve to hold the added weight within the chamber 38.

While various changes may be made in the detail construction, it shall be understood that such changes shall be within the spirit and scope of the present invention as defined by the appended claims.

What is claimed is:

1. A combined sinker and fish chum dispenser comprising a heavy weighted hollow sinker body having a fish chum chamber, said sinker body having a ring portion to which the fish line can be attached and an open lower end communicating with the fish chum chamber, releasable means for attaching the fish chum within the chamber being insertable through the open lower end of the sinker body and secured to the body therewithin, said release means comprising a hook to which solid fish chum can be attached and extended through the open lower end of the sinker body into the chum chamber thereof, and spring catch means of inverted V-shape having a loop in the apex thereof to which said hook is attached, said sinker body having catch holes diametrically opposite from one another and said spring catch having lugs registrable with said catch holes whereby to hold the spring catch and the hook with the chum bait thereon within the chamber and against axial displacement from the open lower end of the sinker body.

2. A combined sinker and fish chum dispenser comprising a heavy weighted hollow sinker body having a fish chum chamber, said sinker body having a ring portion to which the fish line can be attached and an open lower end communicating with the fish chum chamber, releasable means for attaching the fish chum within the chamber being insertable through the open lower end of the sinker body and secured to the body therewithin, said release means comprising a hook to which solid fish chum can be attached and extended through the open lower end of the sinker body and into the chum chamber thereof, spring catch means of inverted V-shape having a loop in the apex thereof to which said hook is attached, said sinker body having catch holes diametrically opposite from one another and said spring catch having lugs registrable with said catch holes whereby to hold the spring catch and the hook with the chum bait thereon within the chamber and against axial displacement from the open lower end of the sinker body, and said sinker body having another set of diametrically opposite catch holes below the first-mentioned catch holes for receiving the spring catch lugs whereby the fish chum can be adjusted to extend different distances from the opening and so that as the chum is used the remaining chum may be made available by lowering the same from the chamber.

3. A combined sinker and fish chum dispenser comprising a heavy weighted hollow sinker body having a fish chum chamber, said sinker body having a ring portion to which the fish line can be attached and an open lower end communicating with the fish chum chamber, releasable means for attaching the fish chum within the chamber being insertable through the open lower end of the sinker body and secured to the body therewithin, said release means comprising a hook to which solid fish chum can be attached and extended through the open lower end of the sinker body and into the chum chamber thereof, spring catch means of inverted V-shape having a loop in the apex thereof to which said hook is attached, said sinker body having catch holes diametrically opposite from one another and said spring catch having lugs registrable with said catch holes whereby to hold the spring catch and the hook with the chum bait thereon within the chamber and against axial displacement from the open lower end of the sinker body, and the lower end of said body having angularly spaced vertically-extending grooves and into which the hook and spring catch extend to hold the hook against angular displacement within the sinker and to guide the lugs of the spring catch to its retaining holes upon being inserted into said chamber.

4. A combined sinker and fish chum dispenser comprising a heavy weighted hollow sinker body having a fish chum chamber, said sinker body having a ring portion to which the fish line can be attached and an open lower end communicating with the fish chum chamber, releasable means for attaching the fish chum within the chamber being insertable through the open lower end of the sinker body and secured to the body therewithin, said release means comprising a hook to which solid fish chum can be attached and extended through the open lower end of the sinker body and into the chum chamber thereof, spring catch means of inverted V-shape having a loop in the apex thereof to which said hook is attached, said sinker body having catch holes diametrically opposite from one another and said spring catch having lugs registrable with said catch holes whereby to hold the spring catch and the hook with the chum bait thereon within the chamber and against axial displacement from the open lower end of the sinker body, and a lifting vane having a hollow body with holes therein adapted to be registered with the catch lug holes of the sinker body and said lugs of the spring catch being extendable into said holes of the vane body to hold the same against axial displacement upon the sinker body.

5. A combined sinker and fish chum dispenser comprising a heavy weighted hollow sinker body having a fish chum chamber, said sinker body having a ring portion to which the fish line can be attached and an open lower end communicating with the fish chum chamber, releasable means for attaching the fish chum within the chamber being insertable through the open lower end of the sinker body and secured to the body therewithin, said release means comprising a hook to which solid fish chum can be attached and extended through the open lower end of the sinker body and into the chum chamber thereof, spring catch means of inverted V-shape having a loop in the apex thereof to which said hook is attached, said sinker body having catch holes diametrically opposite from one another and said spring catch having lugs registrable with said catch holes whereby to hold the spring catch and the hook with the chum bait thereon within the chamber and against axial displacement from the open lower end of the sinker body, and said ring portion of said sinker body being adapted to receive a releasable fish line fastener, a lifting vane body having an opening in its upper end through which the ring portion of the sinker body may be extended and a vane formation having severed upper ends with openings registrable with said ring portion so that the fish line fastener may be extended through both the openings in the vane formation and the sinker body ring portion.

6. A combined sinker and fish chum dispenser comprising a heavy weighted hollow sinker body having a fish chum chamber, said sinker body having a ring portion to which the fish line can be attached and an open lower end communicating with the fish chum chamber, releasable means for attaching the fish chum within the chamber being insertable through the open lower end of the sinker body and secured to the body therewithin, and a lifting vane having a hollow body slidingly fitted over the sinker body, said ring portion of said sinker body being adapted to receive a releasable fish line fastener, said vane body having an opening in its upper end through which the ring portion of the sinker body may be extended and a vane formation having severed upper ends with openings registrable with said ring portion so that the fish line fastener may be extended through both the openings in the vane formation and the sinker body ring portion.

References Cited in the file of this patent

UNITED STATES PATENTS

| | | |
|---|---|---|
| 717,681 | Hodge | Jan. 6, 1903 |
| 2,719,382 | Schachte | Oct. 4, 1955 |